(12) United States Patent
Chung et al.

(10) Patent No.: US 12,309,763 B2
(45) Date of Patent: May 20, 2025

(54) METHOD AND APPARATUS FOR UPLINK TRANSMISSION OR RECEPTION BASED ON SPATIAL PARAMETER IN WIRELESS COMMUNICATION SYSTEM

(71) Applicant: LG ELECTRONICS INC., Seoul (KR)

(72) Inventors: Jaehoon Chung, Seoul (KR); Hyungtae Kim, Seoul (KR); Jiwon Kang, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 346 days.

(21) Appl. No.: 17/787,498

(22) PCT Filed: Mar. 23, 2021

(86) PCT No.: PCT/KR2021/003569
§ 371 (c)(1),
(2) Date: Jun. 20, 2022

(87) PCT Pub. No.: WO2021/194217
PCT Pub. Date: Sep. 30, 2021

(65) Prior Publication Data
US 2023/0036012 A1    Feb. 2, 2023

(30) Foreign Application Priority Data
Mar. 24, 2020    (KR) .......... 10-2020-0035909

(51) Int. Cl.
*H04W 72/20* (2023.01)
*H04L 5/00* (2006.01)
*H04W 72/044* (2023.01)

(52) U.S. Cl.
CPC ......... *H04W 72/046* (2013.01); *H04L 5/0051* (2013.01)

(58) Field of Classification Search
None
See application file for complete search history.

(56) References Cited

U.S. PATENT DOCUMENTS

| | | | |
|---|---|---|---|
| 2020/0228190 A1* | 7/2020 | Cirik | H04L 5/10 |
| 2020/0314860 A1* | 10/2020 | Zhou | H04W 72/23 |

(Continued)

FOREIGN PATENT DOCUMENTS

| | | |
|---|---|---|
| EP | 3817474 | 5/2021 |
| JP | 2020-025214 | 2/2020 |

(Continued)

OTHER PUBLICATIONS

European Patent Office Application Serial No. 21775924.0, Search Report dated Mar. 28, 2024, 9 pages.

(Continued)

*Primary Examiner* — Duc T Duong
(74) *Attorney, Agent, or Firm* — LEE, HONG, DEGERMAN, KANG & WAIMEY

(57) ABSTRACT

A method and an apparatus for uplink transmission and reception based on a spatial parameter in a wireless communication system are disclosed. A method for performing uplink transmission by a user equipment (UE) in a wireless communication system according to an embodiment of the present disclosure may comprise: receiving, from a base station (BS), information on a specific spatial parameter among spatial parameter candidates including at least one of a first set of spatial parameters or a second set of spatial parameters; and performing the uplink transmission, to the BS, based on the specific spatial parameter, and the first set of spatial parameter may include at least one spatial param- (Continued)

eter candidate related to a first cell and a first type of a reference signal (RS).

14 Claims, 12 Drawing Sheets

(56) References Cited

U.S. PATENT DOCUMENTS

| | | | | |
|---|---|---|---|---|
| 2020/0413366 | A1* | 12/2020 | Zhang | G01S 5/02 |
| 2021/0050968 | A1* | 2/2021 | Yi | H04L 5/0048 |
| 2021/0195627 | A1* | 6/2021 | Chen | H04L 1/1896 |
| 2021/0250152 | A1* | 8/2021 | Zhang | H04B 7/0408 |
| 2021/0314784 | A1* | 10/2021 | Gao | H04B 7/0691 |
| 2022/0015085 | A1* | 1/2022 | Zhang | H04B 7/0695 |
| 2022/0264561 | A1* | 8/2022 | Fan | H04B 7/06966 |
| 2022/0393840 | A1* | 12/2022 | Määttanen | H04L 5/0023 |
| 2023/0023281 | A1* | 1/2023 | Zhang | H04B 7/088 |
| 2023/0079891 | A1* | 3/2023 | Shreevastav | G01S 5/10 |
| | | | | 342/458 |
| 2023/0170958 | A1* | 6/2023 | Khoshnevisan | H04W 52/42 |
| | | | | 375/262 |

FOREIGN PATENT DOCUMENTS

| | | |
|---|---|---|
| WO | 2019-216668 | 11/2019 |
| WO | 2020-042123 | 3/2020 |

OTHER PUBLICATIONS

PCT International Application No. PCT/KR2021/003569, International Search Report dated Jun. 29, 2021, 4 pages.
Ericsson, "Enhancements to multi-beam operation," R1-1907436, 3GPP TSG-RAN WG1 Meeting #97, May 2019, 18 pages.
Samsung, "Introduction of eMIMO for NR," R2-2001897, 3GPP TSG-RAN WG2 Meeting #109 electronic, Mar. 2020, 83 pages.
Vivo, "Discussion on physical-layer procedures for UE/gNB measurements," R1-1908177, 3GPP TSG RAN WG1 Meeting #98, Aug. 2019, 8 pages.
Intel Corporation, "NR Positioning Physical Layer Procedures," R1-1908662, 3GPP TSG RAN WG1 Meeting #98, Aug. 2019, 13 pages.

* cited by examiner

METHOD AND APPARATUS FOR UPLINK TRANSMISSION OR RECEPTION BASED ON SPATIAL PARAMETER IN WIRELESS COMMUNICATION SYSTEM

CROSS-REFERENCE TO RELATED APPLICATIONS

This application is the National Stage filing under 35 U.S.C. 371 of International Application No. PCT/KR2021/003569, filed on Mar. 23, 2021, which claims the benefit of earlier filing date and right of priority to Korean Application No. 10-2020-0035909, filed on Mar. 24, 2020, the contents of which are all hereby incorporated by reference herein in their entireties.

TECHNICAL FIELD

The present disclosure relates to a wireless communication system, and more particularly, to a method and an apparatus for performing uplink transmission and reception based on a spatial parameter in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus for performing uplink transmission/reception based on a spatial parameter in a wireless communication system.

An additional technical object of the present disclosure is to provide a method and an apparatus for extending candidates of a spatial parameter applicable to uplink transmission/reception in a wireless communication system.

An additional technical object of the present disclosure is to provide a method and an apparatus for performing uplink transmission/reception based on spatial parameter candidates including a spatial parameter for at least one other cell except for the serving cell of the terminal in a wireless communication system.

The technical objects to be achieved by the present disclosure are not limited to the above-described technical objects, and other technical objects which are not described herein will be clearly understood by those skilled in the pertinent art from the following description.

Technical Solution

A method for performing uplink transmission by a user equipment (UE) in a wireless communication system according to an aspect of the present disclosure may comprise: receiving, from a base station (BS), information on a specific spatial parameter among spatial parameter candidates including at least one of a first set of spatial parameters or a second set of spatial parameters; and performing the uplink transmission, to the BS, based on the specific spatial parameter, and the first set of spatial parameter may include at least one spatial parameter candidate related to a first cell and a first type of a reference signal (RS).

A method for performing uplink reception by a base station (BS) in a wireless communication system according to an additional aspect of the present disclosure may comprise: transmitting, to a user equipment (UE), information on a specific spatial parameter among spatial parameter candidates including at least one of a first set of spatial parameters or a second set of spatial parameters; and performing the uplink reception from the UE, based on the specific spatial parameter, and the first set of spatial parameter may include at least one spatial parameter candidate related to a first cell and a first type of a reference signal (RS).

Technical Effects

According to the present disclosure, a method and an apparatus for performing uplink transmission/reception based on a spatial parameter in a wireless communication system may be provided.

According to the present disclosure, a method and an apparatus for extending candidates of a spatial parameter applicable to uplink transmission/reception in a wireless communication system may be provided.

According to the present disclosure, a method and an apparatus for performing uplink transmission/reception based on spatial parameter candidates including a spatial parameter for at least one other cell except for the serving cell of the terminal in a wireless communication system may be provided.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
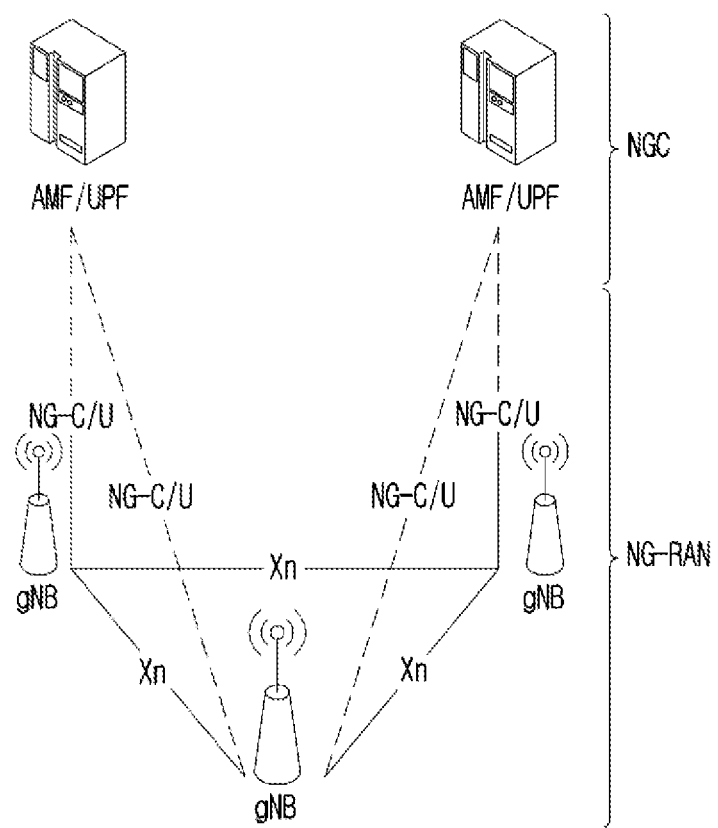
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
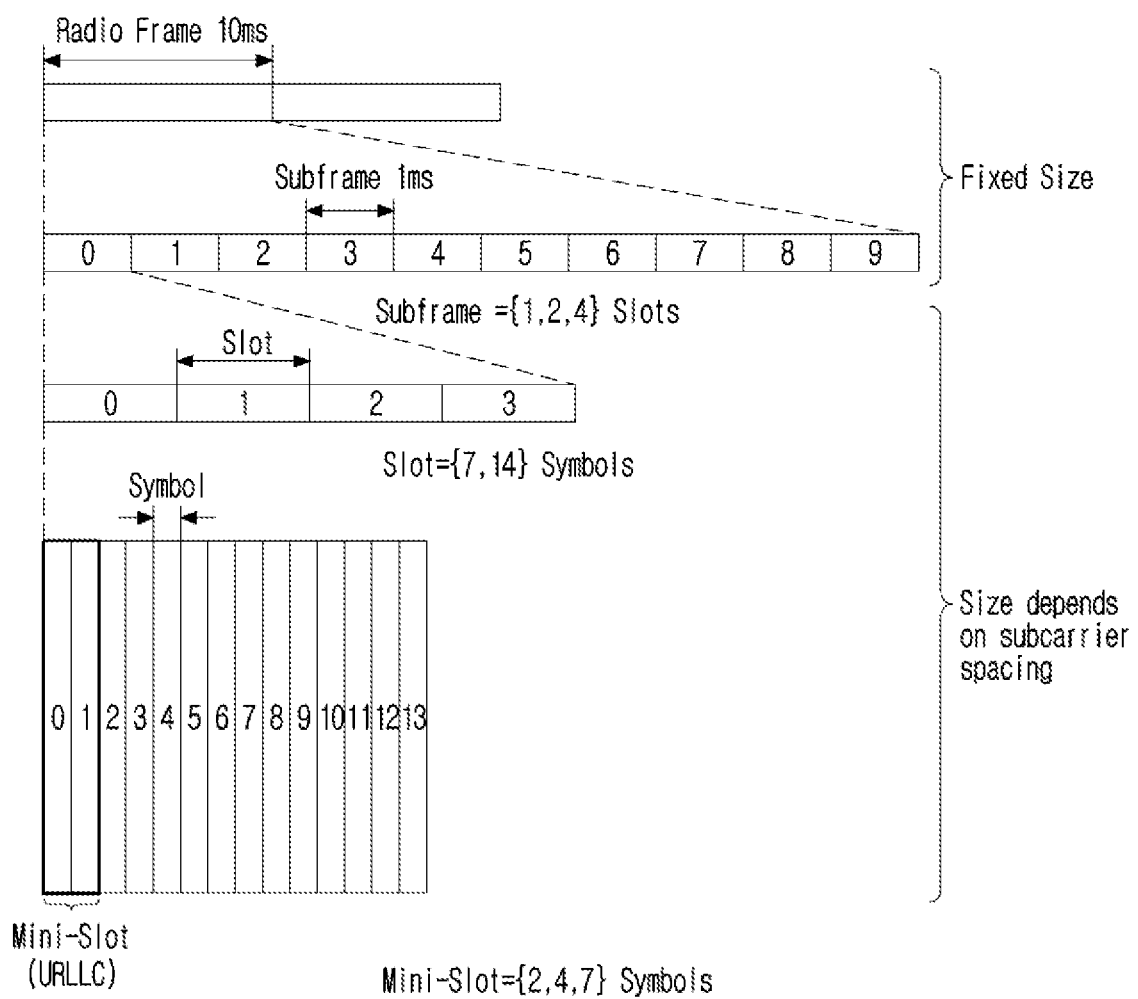
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^μ · 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz - 52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration slots are numbered in an increasing order of $n_s^μ \in \{0, \ldots, N_{slot}^{subframe,μ}-1\}$ in a subframe and are numbered in an increasing order of $N_{s,f}^μ \in \{0, \ldots, N_{slot}^{frame,μ}-1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μ N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,μ}$) and the number of slots per subframe ($N_{slot}^{subframe,μ}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |

TABLE 3-continued

| μ | $N_{symb}^{slot}$ | $N_{slot}^{frame,μ}$ | $N_{slot}^{subframe,μ}$ |
|---|---|---|---|
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
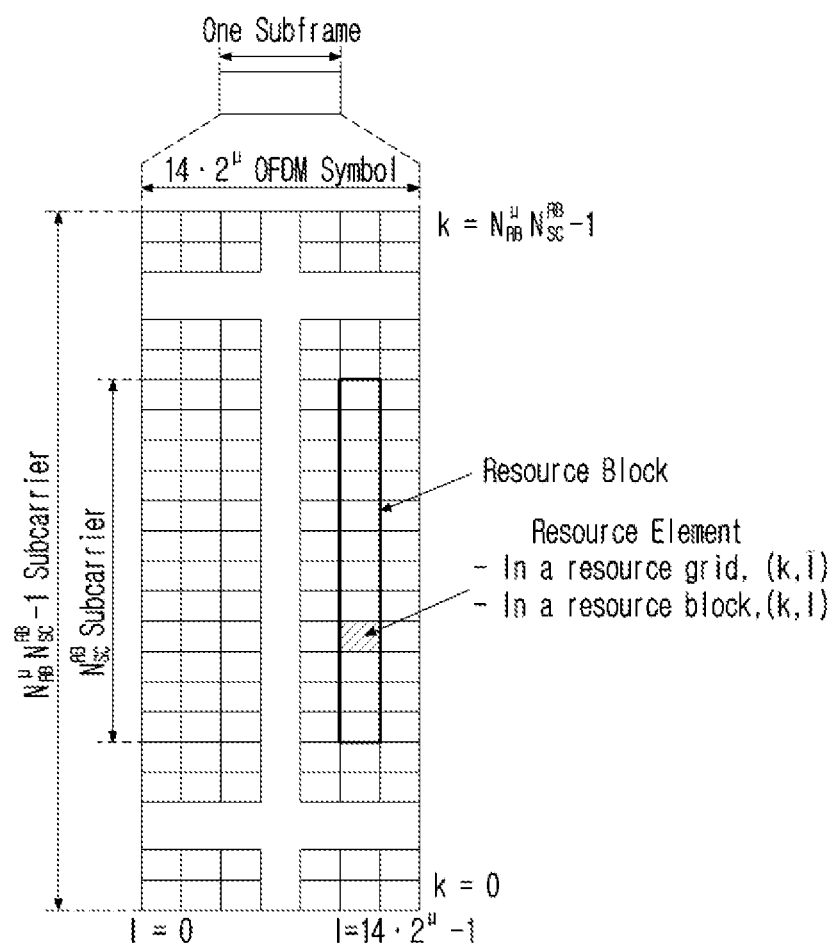
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^μ N_{sc}^{RB}$ subcarriers in a frequency domain and one subframe is configured with $14 \cdot 2^μ$ OFDM symbols, but it is not limited thereto. In an NR system, a transmitted signal is described by OFDM symbols of $2^μ N_{symb}^{(μ)}$ and one or more resource grids configured with $N_{RB}^μ N_{sc}^{RB}$ subcarriers. Here, $N_{RB}^μ \leq N_{RB}^{max,μ}$. The $N_{RB}^{max,μ}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^μ N_{sc}^{RB}-1$ is an index in a frequency domain and l'=0, . . . , $2^μ N_{symb}^{(μ)}-1$ refers to a position of a symbol in a subframe. When referring to a resource element in a slot, an index pair (k,l) is used. Here, l=0, . . . , $N_{symb}^μ-1$. A resource element (k,l') for μ and an antenna port p corresponds to a complex value, $a_{k,l'}^{(p,μ)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
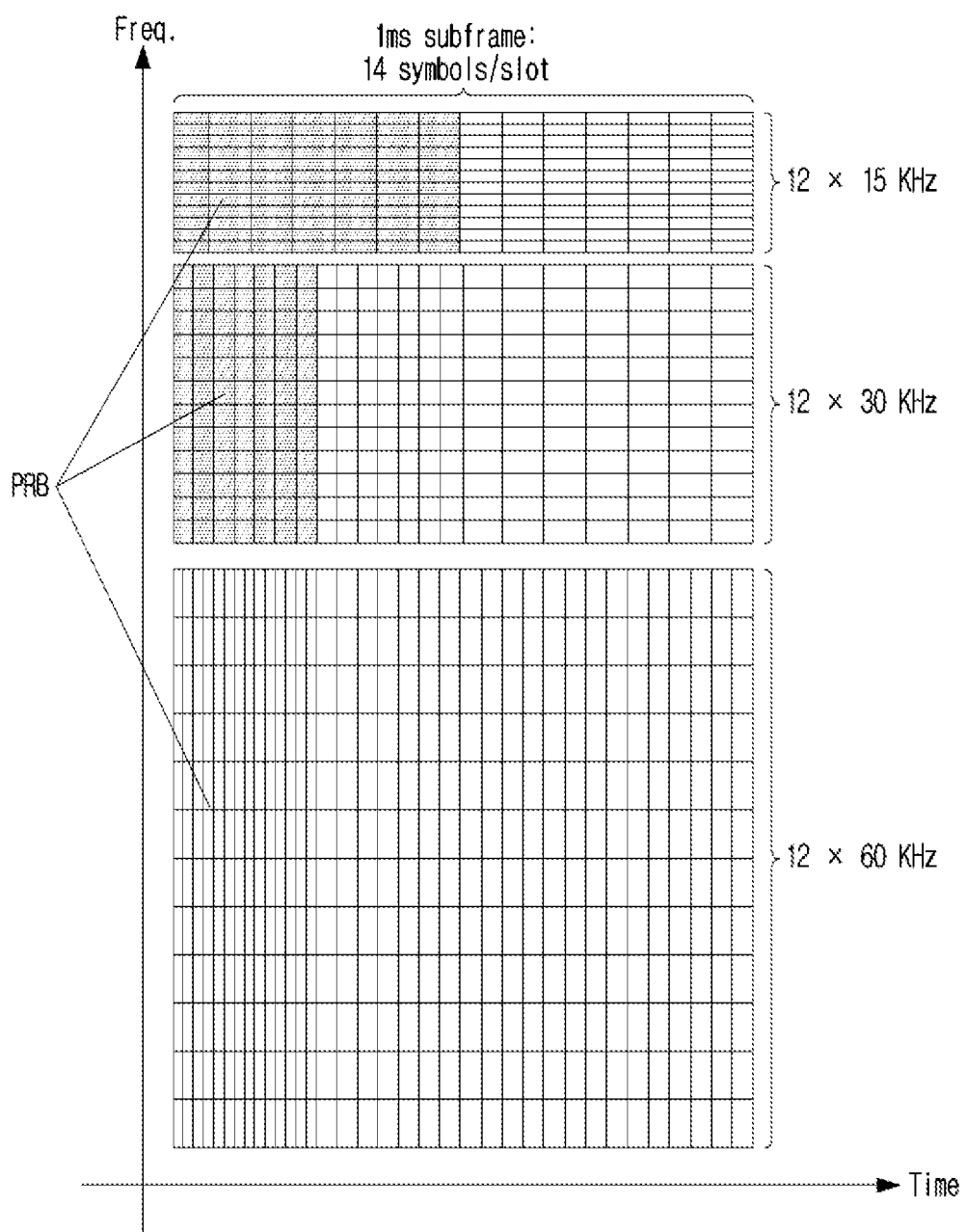
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
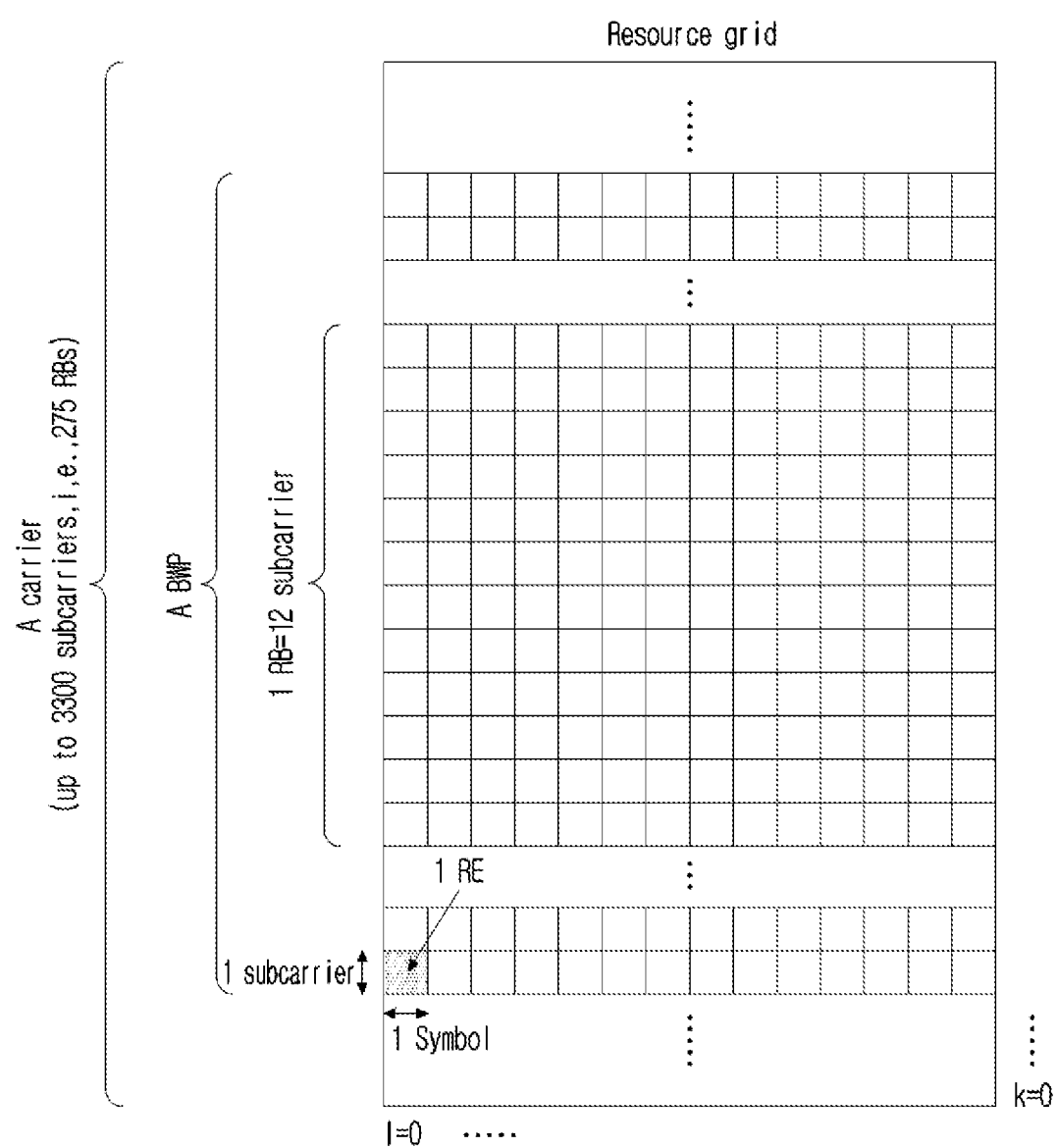
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
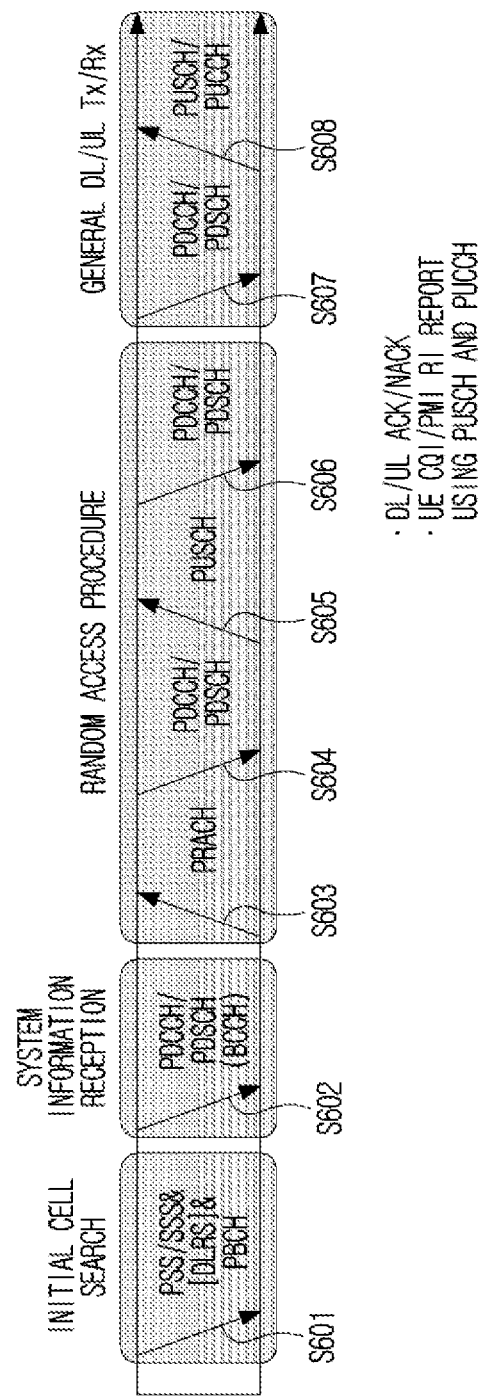
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Beam Management (BM)

A BM procedure is L1 (layer 1)/L2 (layer 2) procedures to obtain and maintain a set of beams of a base station (e.g., a gNB, a TRP, etc.) and/or terminal (e.g., a UE) beams which may be used for downlink (DL) and uplink (UL) transmission/reception, it may include the following procedures and terms.

Beam measurement: An operation that a base station or a UE measures a property of a received beamformed signal Beam determination: An operation that a base station or a UE selects its Tx beam/Rx beam Beam sweeping: An operation that a spatial region is covered by using a Tx and/or Rx beam for a certain time interval in a pre-determined method Beam report: An operation that a UE reports information of a beamformed signal based on beam measurement A BM procedure may be classified into (1) a DL BM procedure using a SS (synchronization signal)/PBCH (physical broadcast channel) Block or a CSI-RS and (2) an UL BM procedure using an SRS (sounding reference signal).

In addition, each BM procedure may include Tx beam sweeping for determining a Tx Beam and Rx beam sweeping for determining a Rx beam.

Hereinafter, a DL BM procedure will be described.

A DL BM procedure may include (1) transmission of beamformed DL RSs (reference signals) of a base station (e.g., a CSI-RS or a SS Block (SSB)) and (2) beam reporting of a terminal.

Here, beam reporting may include preferred DL RS ID (identifier)(s) and corresponding L1-RSRP (Reference Signal Received Power).

The DL RS ID may be a SSBRI (SSB Resource Indicator) or a CRI (CSI-RS Resource Indicator).

Downlink beam management may be performed based on at least one of SSB or CSI-RS. In addition, in downlink beam management, the terminal may determine a reception beam based on at least one of SSB and CSI-RS, and the base station may determine a transmission beam based on the best beam selected by the terminal and quality information thereof. In addition, for resource allocation in the time and frequency domains related to the downlink beam management operation, for example, QCL-related RS information for the NZP CSI-RS may be configured or indicated based on the TCI state.

Hereinafter, uplink beam management will be described.

For UL BM, beam reciprocity (or beam correspondence) between a Tx beam and a Rx beam may be valid or may not be valid according to terminal implementation. If reciprocity between a Tx beam and a Rx beam is valid both in a base station and a terminal, a UL beam pair may be matched by a DL beam pair. But, when reciprocity between a Tx beam and a Rx beam is not valid in any one of a base station and a terminal, a process for determining a UL beam pair is required separately from a DL beam pair determination.

In addition, although both of a base station and a terminal maintain beam correspondence, a base station may use a UL BM procedure for determining a DL Tx beam without requesting a terminal to report a preferred beam.

UL BM may be performed through beamformed UL SRS transmission and whether UL BM of an SRS resource set is applied may be configured by a (higher layer parameter) usage. When a usage is configured as 'BeamManagement (BM)', only one SRS resource may be transmitted in each of a plurality of SRS resource sets in a given time instant.

A terminal may be configured with one or more SRS (Sounding Reference Symbol) resource sets configured by (a higher layer parameter) SRS-ResourceSet (through higher layer signaling, RRC signaling, etc.) For each SRS resource set, a UE may be configured with K≥1 SRS resources (a higher layer parameter SRS-resource). Here, K is a natural number and the maximum number of K is indicated by SRS_capability.

Like DL BM, an UL BM procedure may be also classified into Tx beam sweeping of a terminal and Rx beam sweeping of a base station.

Figure 7:
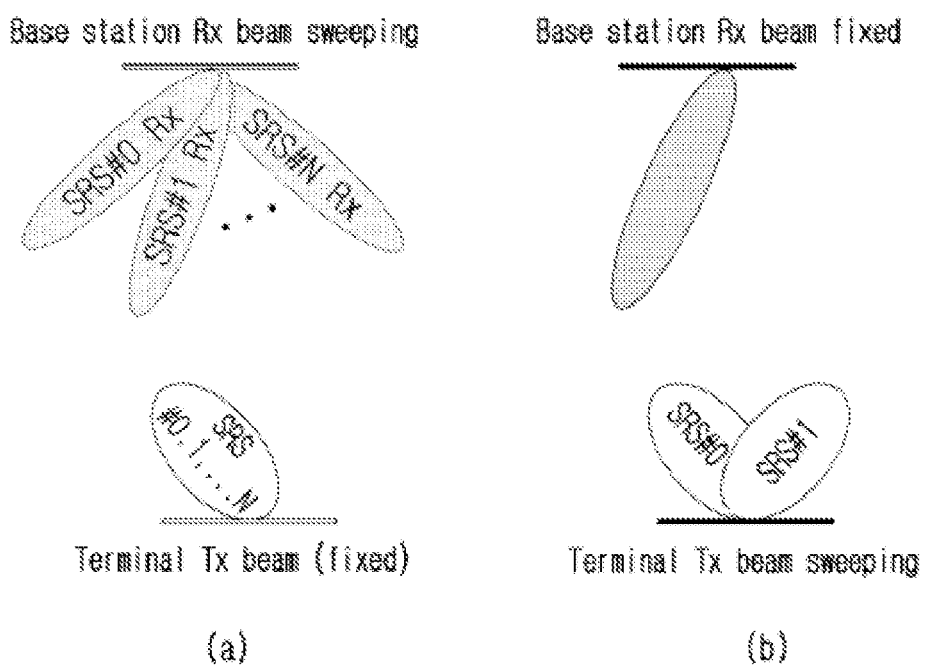
FIG. 7 is a diagram which illustrates an uplink beam management operation using SRS in a wireless communication system to which the present disclosure may be applied.

FIG. 7 is a diagram which illustrates an uplink beam management operation using SRS in a wireless communication system to which the present disclosure may be applied.

FIG. 7(*a*) illustrates a Rx beam determination operation of a base station and FIG. 13(*b*) illustrates a Tx beam sweeping operation of a terminal.

Figure 8:
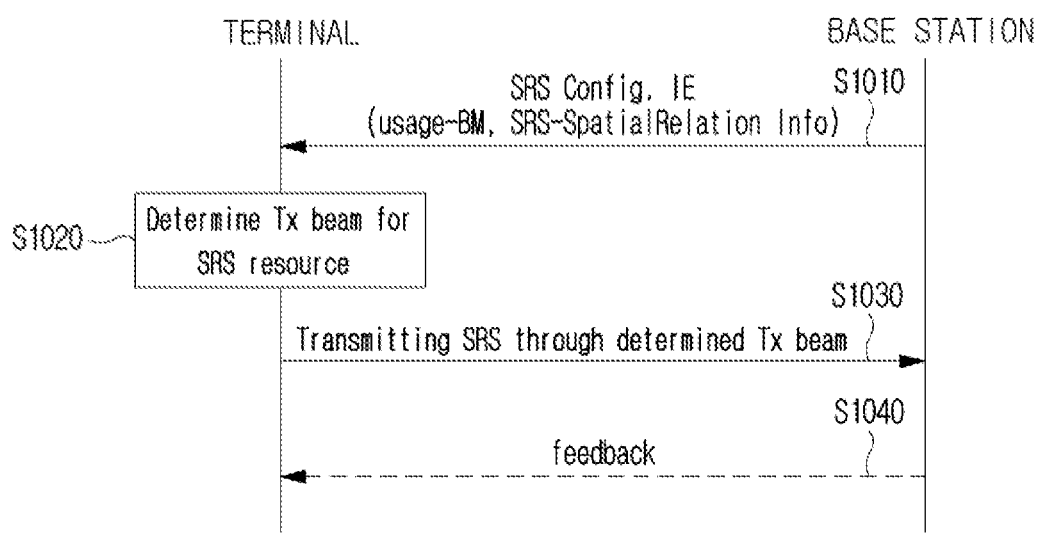
FIG. 8 is a diagram which illustrates an uplink beam management procedure in a wireless communication system to which the present disclosure may be applied.

FIG. 8 is a diagram which illustrates an uplink beam management procedure in a wireless communication system to which the present disclosure may be applied.

A terminal receives RRC signaling (e.g., an SRS-Config IE) including a (higher layer parameter) usage parameter configured as 'beam management' from a base station (S1010).

Table 6 represents an example of an SRS-Config IE (Information Element) and an SRS-Config IE is used for SRS transmission configuration. An SRS-Config IE includes a list of SRS-Resources and a list of SRS-ResourceSets. Each SRS resource set means a set of SRS-resources.

A network may trigger transmission of an SRS resource set by using configured aperiodicSRS-ResourceTrigger (L1 DCI).

TABLE 6

```
ASN1START
TAG-MAC-CELL-GROUP-CONFIG-START
SRS-Config :=                               SEQUENCE{
srs-ResourceSetToReleaseList                SEQUENCE (SIZE(1..maxNrofSRS-
ResourceSets)) OF SRS-ResourceSetId             OPTIONAL, -- Need N
srs-ResourceSetToAddModList                 SEQUENCE (SIZE(1..maxNrofSRS-
ResourceSets)) OF SRS-ResourceSet               OPTIONAL, -- Need N
srs-ResourceToReleaseList                   SEQUENCE (SIZE(1..maxNrofSRS-
Resources)) OF SRS-ResourceId                   OPTIONAL, -- Need N
srs-ResourceToAddModList                    SEQUENCE (SIZE(1..maxNrofSRS-
Resources)) OF SRS-Resource                     OPTIONAL, -- Need N
tpc-Accumulation                            ENUMERATED {disabled}
                                            OPTIONAL, -- Need S SRS-ResourceSet ::=                         SEQUENCE {
srs-ResourceSetId                           SRS-ResourceSetId,
srs-ResourceIdList                          SEQUENCE (SIZE(1..maxNrofSRS-
ResourcesPerSet)) OF SRS-ResourceId             OPTIONAL, - Cond Setup
resourceType                                CHOICE {
aperiodic                                       SEQUENCE {
aperiodicSRS-ResourceTrigger                    INTEGER (1..maxNrofSRS-TriggerStates-1),
csi-RS                                          NZP-CSI-RS-ResourceId
                            OPTIONAL, -- Cond NonCodebook
slotOffset                                      INTEGER (1..32)
                            OPTIONAL, -- Need S
...
},
semi-persistent                                 SEQUENCE {
associatedCSI-RS                                NZP-CSI-RS-ResourceId
                            OPTIONAL, -- Cond NonCodebook
...
},
periodic                                        SEQUENCE {
associatedCSI-RS                                NZP-CSI-RS-ResourceId
                            OPTIONAL, -- Cond NonCodebook
usage                                           ENUMERATED {beamManagement.
codebook. nonCodebook. antennaSwitching},
alpha                                           Alpha
                            OPTIONAL, -- Need S
p0                                              INTEGER (-202..24)
                            OPTIONAL, -- Cond Setup
```

TABLE 6-continued

```
pathlossReferenceRS                CHOICE {
ssb-Index                              SSB-Index,
csi-RS-Index                           NZP-CSI-RS-ResourceId
SRS-SpatialRelationInfo ::=        SEQUENCE {
servingCellId                          ServCellIndex
    OPTIONAL, -- Need S
referencesignal                        CHOICE {
ssb-Index                                  SSB-Index,
csi-RS-Index                               NZP-CSI-RS-ResourceId,
srs                                        SEQUENCE{
resourceId                                     SRS-ResourceId,
uplinkBWP                                      BWP-Id
}
}
}
SRS-ResourceId ::=                 INTEGER
(0..maxNrofSRS-Resources-1)
```

In Table 6, usage represents a higher layer parameter which indicates whether an SRS resource set is used for beam management or is used for codebook-based or non-codebook-based transmission. A usage parameter corresponds to a L1 parameter 'SRS-SetUse'. 'spatialRelation-Info' is a parameter which represents a configuration of a spatial relation between a reference RS and a target SRS. Here, a reference RS may be a SSB, a CSI-RS or a SRS corresponding to a L1 parameter 'SRS-SpatialRelationInfo'. The usage is configured per SRS resource set. A terminal determines a Tx beam for an SRS resource which will be transmitted based on SRS-SpatialRelation Info included in the SRS-Config IE (S1020). Here, SRS-SpatialRelation Info is configured per SRS resource and represents whether the same beam as a beam used in a SSB, a CSI-RS or a SRS will be applied per SRS resource. In addition, SRS-SpatialRelationInfo may be configured or may not be configured for each SRS resource.

If SRS-SpatialRelationInfo is configured for an SRS resource, the same beam as a beam used in a SSB, a CSI-RS or a SRS is applied and transmitted. But, if SRS-SpatialRelationInfo is not configured for an SRS resource, the terminal randomly determines a Tx beam and transmits an SRS through the determined Tx beam (S1030).

In more detail, for a P-SRS that 'SRS-ResourceConfig-Type' is configured as 'periodic':

i) when SRS-SpatialRelationInfo is configured as 'SSB/PBCH', a UE transmits a corresponding SRS resource by applying the same spatial domain transmission filter (or generated by a corresponding filter) as a spatial domain Rx filter used for SSB/PBCH reception; or ii) when SRS-SpatialRelationInfo is configured as 'CSI-RS', a UE transmits a SRS resource by applying the same spatial domain transmission filter used for periodic CSI-RS or SP (semi-persistent) CSI-RS reception; or iii) when SRS-SpatialRelationInfo is configured as ' SRS', a UE transmits a corresponding SRS resource by applying the same spatial domain transmission filter used for periodic SRS transmission.

Although 'SRS-ResourceConfigType' is configured as 'SP (semi-persistent)-SRS' or 'AP (aperiodic)-SRS', a beam determination and transmission operation may be applied in a way similar to the above.

Additionally, a terminal may receive or may not receive a feedback on an SRS from a base station as in the following three cases (S1040).

i) when Spatial_Relation_Info is configured for all SRS resources in a SRS resource set, a terminal transmits an SRS with a beam indicated by a base station. For example, when Spatial_Relation_Info indicates all the same SSB, CRI or SRI, a terminal repetitively transmits an SRS with the same beam. This case corresponds to FIG. 13(a) as a usage for a base station to select an Rx beam.

ii) Spatial_Relation_Info may not be configured for all SRS resources in an SRS resource set. In this case, a terminal may transmit with freely changing SRS beams. In other words, this case corresponds to FIG. 13(b) as a usage for a terminal to sweep Tx beams.

iii) Spatial_Relation_Info may be configured only for a part of SRS resources in an SRS resource set. In this case, for a configured SRS resource, an SRS may be transmitted with an indicated beam, and for a SRS resource that Spatial_Relation_Info is not configured an SRS may be transmitted by randomly applying a Tx beam by a terminal.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}

'QCL-TypeB': {Doppler shift, Doppler spread}

'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-TypeA and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $n+3N_{slot}^{subframe,\mu}+1$. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDurationForQCL), UE may assume that a DMRS port of a PDSCH of a serving cell is quasi-colocated with RS(s) for QCL parameter(s) used for PDCCH QCL indication of a CORESET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).

QCL-TypeC with a SS/PBCH block, and if applicable, QCL-TypeD with the same SS/PBCH block, or QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-ResourceSet including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a SS/PBCH block, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or when QCL-TypeD is not applicable, QCL-TypeB with a CSI-RS resource in configured NZP-CSI-RS-ResourceSet including a higher layer parameter trs-Info.

For a CSI-RS resource of configured NZP-CSI-RS-ResourceSet including a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeC with a SS/PBCH block, and if applicable, QCL-TypeD with the same SS/PBCH block.

For a DMRS of a PDCCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme ¾ is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 9:
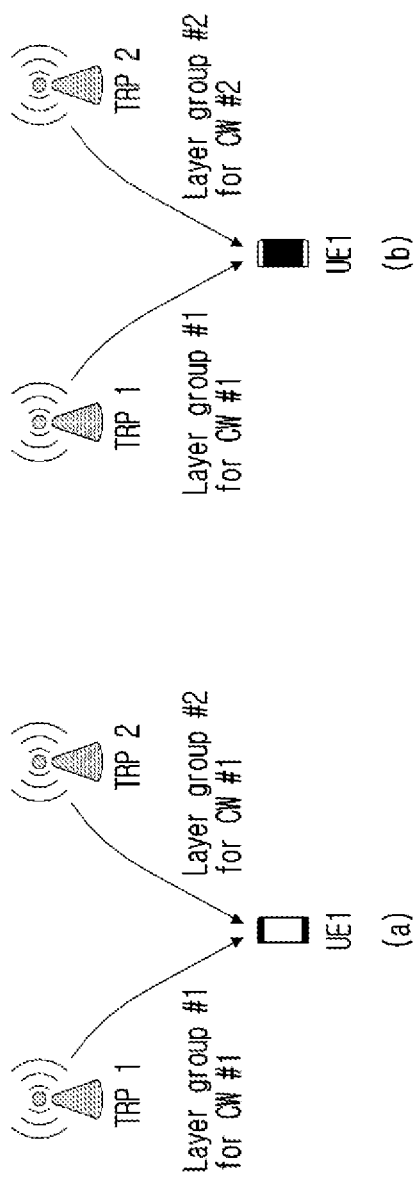
FIG. 9 illustrates a multiple TRP transmission scheme in a wireless communication system to which the present disclosure may be applied.

FIG. 9 illustrates a method of multiple TRPs transmission in a wireless communication system to which the present disclosure may be applied.

In reference to FIG. 9(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 9(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 9(b), it may have a disadvantage that a code rate corresponding to a TB is higher compared to FIG. 9(a). However, it has an advantage that it may adjust a code rate by indicating a different RV (redundancy version) value or may adjust a modulation order of each CW for encoded bits generated from the same TB according to a channel environment.

According to methods illustrated in FIG. 9(a) and FIG. 9(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and Frequency Resource Allocation is Overlapped and n (n<=Ns) TCI States in a Single Slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule.

1-b) Method 1b

The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency Resource Allocation is not Overlapped and n (n<=$N_f$) TCI States in a Single Slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time Resource Allocation is not Overlapped and n (n<=Nt1) TCI States in a Single Slot Each transmission time (occasion) of a TB has time granularity of a mini-slot and has one TCI and one RV.

A common MCS is used with a single or multiple DMRS port(s) at all transmission time (occasion) in a slot.

A RV/TCI may be the same or different at a different transmission time (occasion).

4) Method 4 (TDM): n (n<=Nt2) TCI States in K (n<=K) Different Slots

Each transmission time (occasion) of a TB has one TCI and one RV.

All transmission time (occasion) across K slots uses a common MCS with a single or multiple DMRS port(s).

A RV/TCI may be the same or different at a different transmission time (occasion).

Hereinafter, MTRP URLLC will be described.

In the present disclosure, DL MTRP URLLC means that multiple TRP transmit the same data (e.g., the same TB)/DCI using different layers/time/frequency resources. For example, TRP 1 transmits the same data/DCI in resource 1, and TRP 2 transmits the same data/DCI in resource 2. A UE configured for the DL MTRP-URLLC transmission method receives the same data/DCI using different layer/time/frequency resources. At this time, the UE is configured from the base station which QCL RS/type (i.e., DL TCI state) to use in the layer/time/frequency resource for receiving the same data/DCI. For example, when the same data/DCI is received in resource 1 and resource 2, a DL TCI state used in resource 1 and a DL TCI state used in resource 2 may be configured. Since the UE receives the same data/DCI through resource 1 and resource 2, high reliability can be achieved. This DL MTRP URLLC may be applied to PDSCH/PDCCH.

And, in the present disclosure, UL MTRP-URLLC means that multiple TRP receive the same data/uplink control information (UCI) from one UE by using different layer/time/frequency resources. For example, TRP 1 receives the same data/DCI from the UE in resource 1, and TRP 2 receives the same data/DCI from the UE in resource 2, and then the received data/DCI will be shared through a backhaul link connected between TRPs. The UE configured with the UL MTRP-URLLC transmission scheme transmits the same data/UCI using different layer/time/frequency resources. In this case, the UE is configured by the base station which Tx beam and which Tx power (i.e., UL TCI state) to use in the layer/time/frequency resource for transmitting the same data/UCI. For example, when the same data/UCI is transmitted in resource 1 and resource 2, a UL TCI state used in resource 1 and a UL TCI state used in resource 2 may be configured. This UL MTRP URLLC may be applied to PUSCH/PUCCH.

In addition, in the present disclosure, the meaning of using (or mapping) a specific TCI state (or TCI) when receiving data/DCI/UCI for a certain frequency/time/space resource (layer) is as follows. In the case of DL, it may mean that the channel is estimated from the DMRS by using the QCL type and QCL RS indicated by the TCI state in the frequency/time/spatial resource (layer), and data/DCI is received/demodulated based on the estimated channel. In addition, in the case of UL, it may mean that DMRS and data/UCI are transmitted/modulated using the Tx beam and/or power indicated by the corresponding TCI state in the frequency/time/space resource.

Here, the UL TCI state contains Tx beam and/or Tx power information of the UE, and may be configured to the UE through other parameters such as spatial relation info instead of the TCI state. The UL TCI state may be directly indicated by the UL grant DCI or may mean spatial relation information of the SRS resource indicated through the SRI (sounding resource indicator) field of the UL grant DCI. Or UL TCI state may mean an open loop (OL) transmission power control parameter (OL Tx power control parameter) connected to a value indicated through the SRI field of the UL grant DCI (e.g., j: open loop parameters Po and alpha (maximum per cell) index for 32 parameter value sets), q_d: index of DL RS resource for PL (pathloss) measurement (up to 4 measurements per cell), l: closed loop power control process index (up to 2 per cell) processes)).

Hereinafter, MTRP eMBB will be described.

In the present disclosure, MTRP-eMBB means that multiple TRP transmits different data (e.g., different TB) using different layer/time/frequency. It is assumed that the UE configured with the MTRP-eMBB transmission method is indicated by several TCI states by DCI, and data received using the QCL RS of each TCI state are different data.

On the other hand, whether the MTRP URLLC transmission/reception or the MTRP eMBB transmission/reception is performed may be determined by the UE by separately using the RNTI for MTRP-URLLC and the RNTI for MTRP-eMBB. That is, when CRC masking of DCI is performed using RNTI for URLLC, the UE regards URLLC transmission, and when CRC masking of DCI is performed using RNTI for eMBB, the UE regards eMBB transmission. Alternatively, the base station may configure MTRP URLLC transmission/reception to the UE or TRP eMBB transmission/reception through other new signaling.

In the description of the present disclosure, it is described assuming cooperative transmission/reception between 2 TRPs for convenience of description, but the method proposed in the present disclosure may be extended and applied even in three or more multi-TRP environments and may be extended and applied to the multi-panel environment (that is, by matching the TRP to the panel). In addition, different TRPs may be recognized by the UE as different TCI states. Therefore, the UE receiving/transmitting data/DCI/UCI using TCI state 1 means that it receives/transmits data/DCI/UCI from/to TRP 1.

Uplink Transmission/Reception Based on a Spatial Parameter Associated with Multiple Cells Hereinafter, various examples of the present disclosure for performing uplink transmission/reception based on a spatial parameter associated with multiple cells in a wireless communication system supporting transmission/reception for multiple cells will be described.

In the following examples, the term cell may be replaced with terms such as TRP, panel, TP, and base station, and the like.

A spatial parameter related to downlink transmission/reception (or a parameter related to beam transmission/reception) may include QCL information applied to a physical channel through which downlink control information or data is transmitted/received or assumed by the terminal. The QCL information may include QCL reference signal (RS) information, and the QCL RS information may be configured for each QCL type (e.g., QCL type A/B/C/D). For example, downlink control information (DCI) may be transmitted/received through PDCCH, and a spatial parameter related to DCI transmission/reception may include QCL reference information for PDCCH DMRS antenna port(s), TCI state information, and the like. In addition, downlink data may be transmitted/received through PDSCH, and a spatial parameter related to downlink data transmission/reception may include QCL reference information for PDSCH DMRS antenna port(s), TCI status information, and the like.

However, in the present disclosure, the term spatial parameter is not limited to QCL information and may include a spatial parameter applied to uplink transmission (e.g., spatial relation info related to an uplink transmission beam). For example, uplink control information (UCI) may be transmitted/received through PUCCH and/or PUSCH, and a spatial parameter related to UCI transmission/reception may include resource indicator (PRI) related to PUCCH/PUSCH transmission/reception, spatial relation info, or QCL reference RS related thereto, and the like.

In addition, the spatial parameter may be separately configured for downlink or uplink, or configured for downlink and uplink integrally, or a linkage may be configured between a spatial parameter for downlink reception and a spatial parameter for uplink transmission.

In addition, a spatial parameter may be defined or configured as a spatial parameter set including at least one spatial parameter. Hereinafter, in order to simplify the description, at least one spatial parameter is collectively referred to as a spatial parameter.

In order for the base station to configure/indicate the PDCCH reception spatial parameter (or reception beam) of the terminal, it may configure/update the TCI state ID for each of at least one CORESET. The TCI state configured for CORESET may indicate QCL reference information (e.g., QCL type D related information) for PDCCH DMRS antenna port(s) transmitted through the corresponding CORESET. That is, QCL reference information (e.g., QCL Type D information) of the TCI state ID configured/updated for each CORESET may correspond to the PDCCH reception beam of the terminal.

In the case of configuring/indicating a spatial parameter (or reception beam) for PDSCH reception, a TCI field may be included in the PDCCH DCI for scheduling the corresponding PDSCH. The TCI state ID (or TCI codepoint) indicated by the TCI field in DCI may indicate QCL reference information (e.g., QCL type D related information) for the PDSCH DMRS antenna port(s).

In the following description, a spatial parameter or spatial relation info may have a meaning including RS information/QCL relation (or reference) RS information/QCL parameter, or the like for spatial relation assumption for data/signal transmitted/received through UL channel/DL channel or may be expressed by being mixed/replaced by the above terms.

In the following examples, the meaning of using/applying/mapping a specific spatial parameter (or TCI state or TCI) when transmitting/receiving data/DCI/UCI for a certain frequency/time/spatial resource may mean, in the case of DL, estimating a channel from DMRS using the QCL type and QCL RS indicated by the corresponding spatial parameter in the corresponding frequency/time/spatial resource and receiving/demodulating data/DCI (e.g., PDSCH/PDCCH) with the estimated channel and, in the case of UL, transmitting/modulating DMRS and data/UCI (e.g., PUSCH/PUCCH) using a transmission power and/or a transmission beam indicated by the corresponding spatial parameter in the corresponding frequency/time/spatial resource.

In multi-cell PDSCH transmission, single DCI-based PDSCH transmission or multiple DCI-based PDSCH transmission may be supported. When HARQ-ACK (e.g., HARQ ACK/NACK) information for PDSCH scheduling is transmitted through PUCCH, a PUCCH resource may be indicated by a PRI field included in DL DCI, and a RS of spatial relation info for PUCCH transmission may be applied based on RS designated as spatial relation info or a spatial parameter of the corresponding resource.

Here, as a reference RS in spatial relation info for a PUCCH resource, for example, CSI-RS, SSB, SRS, and the like may be used. Specifically, when the RS designated by the spatial relation info of PUCCH is the SSB, the pool for the corresponding resource may be independently configured for each cell by RRC signaling. Accordingly, a transmission beam may be configured to be limited to a UE-specific or UE-dedicated cell. Similarly, in the case of CSI-RS or SRS, a spatial parameter for uplink transmission may be configured for a specific cell.

As such, a spatial parameter for uplink transmission may be limited to being configured only for a specific cell. In addition, in the case of uplink transmission for multiple cells, uplink transmission (e.g., PUCCH and/or PUSCH transmission) on a cell other than a specific cell may not be supported. That is, flexibility for spatial parameter configuration in uplink transmission for multiple cells may be limited.

In order to solve this problem, for a terminal supporting uplink transmission for multiple cells, a method of performing more flexible uplink transmission by extending a spatial parameter candidate for uplink transmission to a spatial parameter for multiple cells.

Hereinafter, various examples of improved spatial parameter setting in triggering/scheduling of uplink transmission for multi-cell to the terminal by the base station will be described.

Figure 10:
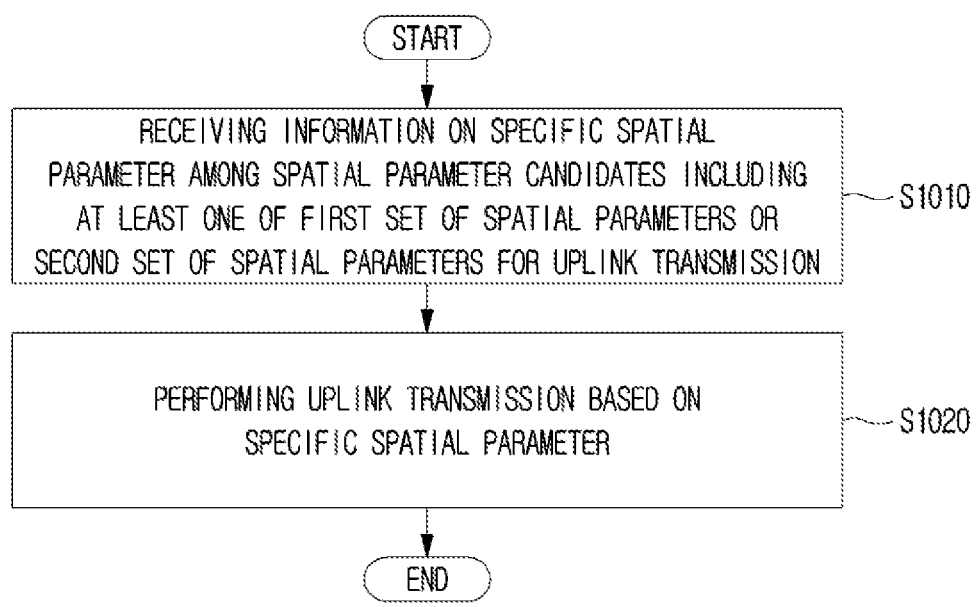
FIG. 10 is a flowchart for explaining a spatial parameter-based uplink transmission method for a multi-cell of a terminal according to the present disclosure.

FIG. 10 is a flowchart illustrating a spatial parameter-based uplink transmission method for a multi-cell of a terminal according to the present disclosure.

In step S1010, the terminal may receive information on a specific spatial parameter from among spatial parameter candidates including at least one of a first set of spatial parameters and a second set of spatial parameters for uplink transmission.

The first set of spatial parameters may include spatial parameter candidate(s) configured for the first cell of the terminal and related to the first type. For example, the first cell may correspond to a serving cell of the terminal. For example, the first type may correspond to at least one of SSB, CSI-RS, or SRS.

The second set of spatial parameters may include spatial parameter candidate(s) related to one or more of the second cell or the second type. For example, the second cell may correspond to a cell other than the serving cell of the terminal. For example, the second type may correspond to SSB, CSI-RS, or other types of RS other than SRS (e.g., mobility CSI-RS, positioning RS, etc.).

Also, spatial parameter candidate(s) configured for the first cell may or may not include cell identifier information. The spatial parameter candidate(s) related to the second cell may include cell identifier information or may be configured in association with the second cell (or for the second cell) even if it does not directly include cell identifier information.

In step S1020, the terminal may perform uplink transmission based on the specific spatial parameter. For example, the uplink transmission may include PUCCH and/or PUSCH transmission for at least one cell.

Embodiment 1

This embodiment relates to a method of configuring/indicating cell identifier information for a spatial parameter for uplink transmission.

For example, the base station may configure/indicate the terminal together with the cell identifier and the related RS for a spatial parameter for multi-cell uplink transmission. As a specific example, for a spatial parameter (e.g., spatial relation info) used for determination of a transmission beam applied to uplink transmission (e.g., PUCCH/PUSCH transmission) for multiple cells, the base station may configure/indicate to the terminal a physical cell ID (PCI), which is an indicator for a specific cell along with a reference RS (e.g., CSI-RS, SSB, SRS). Here, the PCI is only an example of a cell identifier and may be a logical identifier for distinguishing different cells or an identifier for distinguishing a group of cells.

In order to achieve a smooth multi-cell operation, RS of spatial relation info may be informed to neighboring cell(s) other than a specific cell to which the UE belongs. In other words, spatial relation info may include reference RS information and PCI information associated with the reference RS.

For example, the UE may be configured/receive different spatial relation info (e.g., reference RS and PCI) associated with each of different CORESET groups which are distinguished/identified by a CORESET group (or CORESET pool) ID (or index). For example, different CORESET groups/pools may correspond to different cells (or different TRPs). Even if the UE does not recognize that each CORESET group corresponds to which cell/TRP (that is, the correspondence between the CORESET group and the cell/TRP is transparent to the UE), the UE may perform uplink transmission for multiple cells (or multiple TRPs) by performing uplink transmission based on the spatial relation info indicated by the base station. In addition, a plurality of spatial relation info may be configured for different CORESET groups, or a plurality of CORESETs belonging to different CORESET groups.

As such, when PCI is provided together with the reference RS of spatial relation info, the following advantageous effects can be achieved.

For example, when CSI-RS or SRS is configured as a reference RS for spatial relation info, since a CSI-RS/SRS resource pool (or candidate) exists for each PCI, the degrees of freedom of selection for RS of spatial relation info for uplink transmission beam configuration may be increased. In contrast, in the conventional MTRP operation, since resources are divided (e.g., equally divided or differentially divided) by the number of TRPs in the CSI-RS/SRS resource pool configured for one cell, the number of candidates available for the uplink transmission beam indication may be reduced for each TRP, so that flexibility may be limited.

For example, when SSB is configured as a reference RS for spatial relation info, SSB resource(s) configured for other cells based on PCI may also be used as a basis for uplink transmission beam configuration. For example, since access to the SSB resource configured for another cell is possible through PCI, an uplink transmission operation to another cell is possible with the RS component of the corresponding spatial relation info. The SSB resource pool (or candidate) is independently configured for each cell (e.g., RRC configuration), so it is difficult to access SSB resources configured in other TRPs without PCI and it may be limited to use only SSB resources in a specific cell (e.g., cell to which the UE belongs).

According to this embodiment, the terminal may receive information for a specific spatial parameter from among spatial parameter candidates including at least one of a first set of spatial parameters (e.g., a spatial parameter set configured for the first cell which is a serving cell of the terminal, including a cell identifier for the first cell, and including a first type (e.g., SSB, CSI-RS, or SRS) of RS) or a second set of spatial parameters (e.g., a spatial parameter set configured for the second cell which is a cell other than serving cell of the terminal, including a cell identifier for the second cell, and including a first type (e.g., SSB, CSI-RS, or SRS) of RS) for uplink transmission. That is, the specific spatial parameter configured/indicated for the terminal may be related to the first type of RS configured for the first cell or may be related to the first type of RS configured for the second cell.

As an additional example, a plurality of cell identifiers may be configured in one reference RS in spatial relation info. In this case, UL repetition transmission for a single resource (e.g., CSI-RS/SRS/SSB resource) index may be supported. For example, a multi-cell operation may be supported by sequentially or alternately (e.g., in a comb form) determining/changing transmission beams for different cells based on the same reference RS. For example, the operation may be defined to be performed when an indicator for multi-cell repetition transmission is configured by a higher layer. If the indicator for multi-cell repetition transmission is not defined, is not configured, or is configured to OFF, a specific one of a plurality of cell identifiers configured for one resource may be determined by a predefined rule. For example, a cell identifier having the lowest or highest ID among a plurality of cell identifiers may be determined as the specific one cell identifier.

Embodiment 2

This embodiment relates to a method of configuring/indicating cell identifier information for an RS configured for a cell other than a serving cell in an RS related to a spatial parameter for uplink transmission.

For example, the base station may configure/indicate to the terminal the related RS configured for the first cell or the second cell with respect to a spatial parameter for multi-cell uplink transmission. As a specific example, with respect to a spatial parameter (e.g., spatial relation info) used for determination of a transmission beam applied to uplink transmission (e.g., PUCCH/PUSCH transmission) for multiple cells, the base station may configure/indicate to the terminal a RS configured for at least one cell other than the serving cell as a reference RS. That is, even if the terminal is not explicitly informed or not informed of the RS configured for which cell, the reference RS candidates that can be configured/indicated to the terminal may be extended/changed up to the RS configured for another cell.

For example, when an SSB resource identifier (SSBRI) is indicated as a reference RS for spatial relation info, the candidate can be extended to SSBRIs configured for the first cell as well as SSBRIs for the second cell.

For example, SSB resources configured by the SIB or UE-specific RRC parameter may be up to 64 for the first cell, and different SSB resources may be mapped to different SSBRIs and distinguished. In this regard, a SSB resource and SSBRI mapping may be extended or changed through additional higher layer signaling. For example, the maximum number of SSB resources may be extended (e.g., 128), and SSBRI values other than the SSBRI values mapped to the SSB resources of the first cell may be mapped to the SSB resources of the second cell.

In order to indicate the reference RS configured for different cells, resource location information for a resource (e.g., SSB/CSI-RS/SRS resource) related to the reference RS and cell identifier information, and the like may be provided/configured to the terminal.

According to this embodiment, the terminal may receive information for a specific spatial parameter from among spatial parameter candidates including at least one of a first set of spatial parameters (e.g., a spatial parameter set configured for the first cell which is a serving cell of the terminal and including a first type (e.g., SSB, CSI-RS, or SRS) of RS) or a second set of spatial parameters (e.g., a spatial parameter set configured for the second cell which is a cell other than serving cell of the terminal and including a first type (e.g., SSB, CSI-RS, or SRS) of RS) for uplink transmission. That is, the specific spatial parameter configured/indicated for the terminal may be related to the first type of RS configured for the first cell or may be related to the first type of RS configured for the second cell.

Embodiment 3

This embodiment relates to a method of configuring/indicating at least one RS of the first type or the second type with respect to a spatial parameter for uplink transmission.

For example, the base station may configure/indicate a specific reference RS among reference RS candidates including the second type of reference RS in addition to the first type of reference RS for spatial parameters for multi-cell uplink transmission to the terminal. For example, with respect to a spatial parameter (e.g., spatial relation info) used for determination of a transmission beam applied to uplink transmission (e.g., PUCCH/PUSCH transmission) for multiple cells, the base station may configure/indicate to the terminal a specific reference RS among reference RS candidates including the first type of reference RS (e.g., CSI-RS, SRS, SSB) and a second type of reference RS (e.g., CSI-RS for additional or other purposes).

For example, when a CSI-RS resource identifier (CRI) is indicated as a reference RS for spatial relation info, the candidate may be extended to not only the CRIs of the first type of CSI-RS but also the CSI-RS of the second type.

For example, different first-type CSI-RS resources may be mapped to different CRIs to be distinguished. Here, the first type of CSI-RS resource may be CSI-RS resource(s) belonging to a CSI-RS resource pool. The CSI-RS resource pool may correspond to CSI-RS resource(s) corresponding to csi-RS-ResourceSetList included in CSI-ResourceConfig configured by a higher layer. For example, a CSI-RS resource for channel estimation/beam management for CSI reporting may correspond to a CSI-RS resource of the first type.

In addition to this, the CSI-RS of the second type may be added as a reference RS of spatial relation info. For example, the CSI-RS of the second type may correspond to a mobility CSI-RS. In the existing spatial relation info, only CSI-RS, SSB, and SRS may be configured/indicated as reference RS, and configuring/indicating CSI-RS for other mobility usage as reference RS was not supported.

The mobility CSI-RS may be configured as a resource pool independent of the CSI-RS that may be configured/indicated in relation to the existing reference RS. Therefore, when the mobility CSI-RS is included as a candidate for the reference RS, association flexibility for spatial parameters can be improved. In addition, since the mobility CSI-RS may be indicated by integrating spatial parameters for multiple cells (or multiple TRPs), it can be easily applied to beam determination related to uplink transmission for the first cell or the second cell.

As an additional example, a downlink positioning reference signal (PRS) may be included in the second type of reference RS. The configuration information for the PRS may include a cell identifier (or TRP ID). Therefore, it is also possible to configure/indicate PRS to be referenced even for CSI-RS/SRS/SSB, which are reference RS candidates of the first type of spatial parameter. If the PRS is configured as the reference RS, PCI may or may not be included in the spatial parameter.

According to this embodiment, the terminal may receive information for a specific spatial parameter from among spatial parameter candidates including at least one of a first set of spatial parameters (e.g., a spatial parameter set configured for the first cell which is a serving cell of the terminal and including a first type (e.g., SSB, CSI-RS, or SRS) of RS) or a second set of spatial parameters (e.g., a spatial parameter set configured (regardless of a type) for the second cell which is a cell other than serving cell of the terminal and including a second type (configured for the first cell and/or the second cell) (e.g., mobility CSI-RS, PRS) of RS) for uplink transmission. That is, the specific spatial parameter configured/indicated for the terminal may be related to the first type of RS configured for the first cell, related to the first type of RS configured for the second cell, or related to the second type of RS configured for the second cell.

In the above-described examples, a cell may be applied by being replaced with an expression of a TRP, a panel, a transmission point (TP), a base station (gNB, etc.). In addition, the TRP may be distinguished according to information (e.g., index) on the CORESET group (or CORESET pool). As an example, when one terminal is configured to perform transmission/reception with a plurality of TRPs (or cells), this may mean that a plurality of CORESET groups (or CORESET pools) are configured for one terminal. The configuration of such a CORESET group (or CORESET pool) may be performed through higher layer signaling (e.g., RRC signaling, etc.). In addition, when a plurality of CORESET groups are configured for one terminal, the corresponding terminal may be configured or defined to receive data using a multi-DCI-based M-TRP operation.

Figure 11:
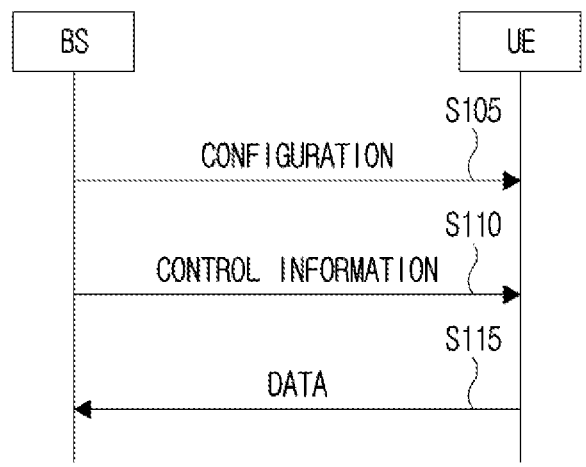
FIG. 11 is a diagram which illustrates a signaling procedure according to an embodiment of the present disclosure.

FIG. 11 is a diagram for explaining a signaling process according to an embodiment of the present disclosure.

An example of the signaling operation of the base station and the terminal for the above-described embodiments may be as shown in FIG. 11. Here, the terminal/base station is only an example, and as described in FIG. 12, it may be substituted for various devices. For example, the base station may mean a generic term for an object that transmits and receives data to and from the terminal. For example, the base station may be a concept including one or more TPs (Transmission Points), one or more TRPs (Transmission and Reception Points), and the like. For example, the base station may be one base station including a plurality of TRPs and may be one cell including a plurality of TRPs. In addition, the TP and/or TRP may include a panel of a base station, a transmission and reception unit, and the like. In addition, as described above, the TRP may be distinguished according to information (e.g., index, ID) about the CORESET group (or CORESET pool). For example, when one terminal is configured to perform transmission/reception with a plurality of TRPs (or cells), this may mean that a plurality of CORESET groups (or CORESET pools) are configured for one terminal. The configuration of such a CORESET group (or CORESET pool) may be performed through higher layer signaling (e.g., RRC signaling, etc.). FIG. 11 is only for convenience of description and does not limit the scope of the present invention. Also, some step(s) shown in FIG. 11 may be omitted depending on circumstances and/or settings. In addition, in the operation of the base station/terminal of FIG. 11, the above-described downlink transmission/reception operation, uplink transmission/reception operation, beam management operation, MTRP operation, etc. may be applied, but the scope of the present disclosure is not limited thereto and may be applied to various downlink reception or uplink transmission operation.

The UE may receive configuration information (Configuration) from the base station (S105). The Configuration may include system information (SI), scheduling information, beam management (BM) related settings (e.g., DL BM related CSI-ResourceConfig IE, NZP CSI-RS resource set IE, etc.), the configuration information of the base station (e.g., TRP configuration) and the like. For example, the Configuration includes spatial parameter-related information (e.g., spatial relation or QCL relation). For example, based on the example of the above-described embodiment 1/2/3 and FIG. 10, the spatial parameter related information may include RS information for a spatial relation (or QCL relation) and a DL channel (e.g., PDCCH/PDSCH)/UL channel (e.g., PUSCH/PUCCH), QCL-related configuration information, cell-related information (e.g., PCI), etc. For example, CSI-RS/SSB/PRS/mobility CSI-RS/SRS may be configured as an example of RS for spatial relation (or QCL relation). For example, PCI information associated with RS for a spatial relation (or QCL relation) may be included. For example, based on the example of the above-described embodiment 1/2/3, FIG. 10, etc., the Configuration may include information on at least one of TCI state(s), QCL RS(s), and DMRS port(s). For example, the configuration may further include RS (e.g., SSB) configuration/indication information of another cell. For example, the configuration may include information related to repetition transmission of UL data (e.g., the number of repetition transmissions, etc.). The configuration may be transmitted through higher layer (e.g., RRC or MAC CE) signaling. In addition, when the configuration information is predefined or preconfigured, the corresponding step may be omitted.

For example, the operation of receiving the Configuration, by the UE (100/200 in FIG. 12), from the base station (200/100 in FIG. 12) in the above-described step S105 may be implemented by the apparatus of FIG. 12 to be described below. For example, referring to FIG. 12, one or more processors 102 may control one or more transceivers 106 and/or one or more memories 104, etc. to receive the Configuration, and one or more transceivers 106 may receive the configuration from the base station.

The UE may receive control information from the base station (S110). The control information may be received through a control channel (e.g., PDCCH). For example, the control information may be DCI/UCI. For example, the control information may include scheduling information for a downlink data channel (e.g., PDSCH) and/or an uplink channel (e.g., PUCCH/PUSCH) and the like. For example, based on the above-described embodiments 1/2/3 and FIG. 10m, etc., the control information may include information on at least one of TCI state(s), QCL RS(s), or DMRS port(s). For example, one or more TCI states may be configured for DMRS port(s) related to a DL data channel (e.g., PDSCH)/ UL channel (e.g., PUCCH/PUSCH) by the TCI state field in the control information (e.g., DCI). For example, the TCI state may include RS information for spatial relation (e.g., QCL relation) assumption. For example, CSI-RS/SSB/PRS/ mobility CSI-RS/SRS may be configured as an example of RS for spatial relation (or QCL relation) assumption.

For example, the operation of receiving the control information, by the UE (100/200 in FIG. 12), from the base station (200/100 in FIG. 12) in the above-described step S110 may be implemented by the apparatus of FIG. 12 to be described below. For example, referring to FIG. 12, one or more processors 102 may control one or more transceivers 106 and/or one or more memories 104, etc. to receive the control information, and one or more transceivers 106 may receive the control information from the base station.

The UE may transmit UL Data to the base station (S115). The UL Data may be transmitted through an uplink channel (e.g., PUCCH/PUSCH). For example, the UL Data may be scheduled based on the control information (e.g., DCI). In addition, the UL Data may be transmitted based on information configured/indicated in steps S105/S110. For example, based on the example of the above-described embodiment 1/2/3 and FIG. 10, a spatial relation-related RS (e.g., QCL type D RS) for transmitting the UL data may be configured, and the UL Data may be transmitted based on a spatial relation-related RS (e.g., CSI-RS/SSB/PRS/mobility CSI-RS/SRS, etc.).

For example, the operation of transmitting the UL data, by the UE (100/200 in FIG. 12), to the base station (200/100 in FIG. 12) in the above-described step S115 may be implemented by the apparatus of FIG. 12 to be described below. For example, referring to FIG. 12, one or more processors 102 may control one or more transceivers 106 and/or one or more memories 104, etc. to transmit the UL data, and one or more transceivers 106 may transmit the UL data to the base station.

As mentioned above, the above-described base station/UE signaling and operation (e.g., embodiment 1, embodiment 2, embodiment 3, FIGS. 10, 11, etc.) can be implemented by the apparatus of FIG. 12 to be described below. For example, the base station may correspond to the first wireless device, the UE may correspond to the second wireless device, and vice versa may be considered in some cases.

Figure 12:
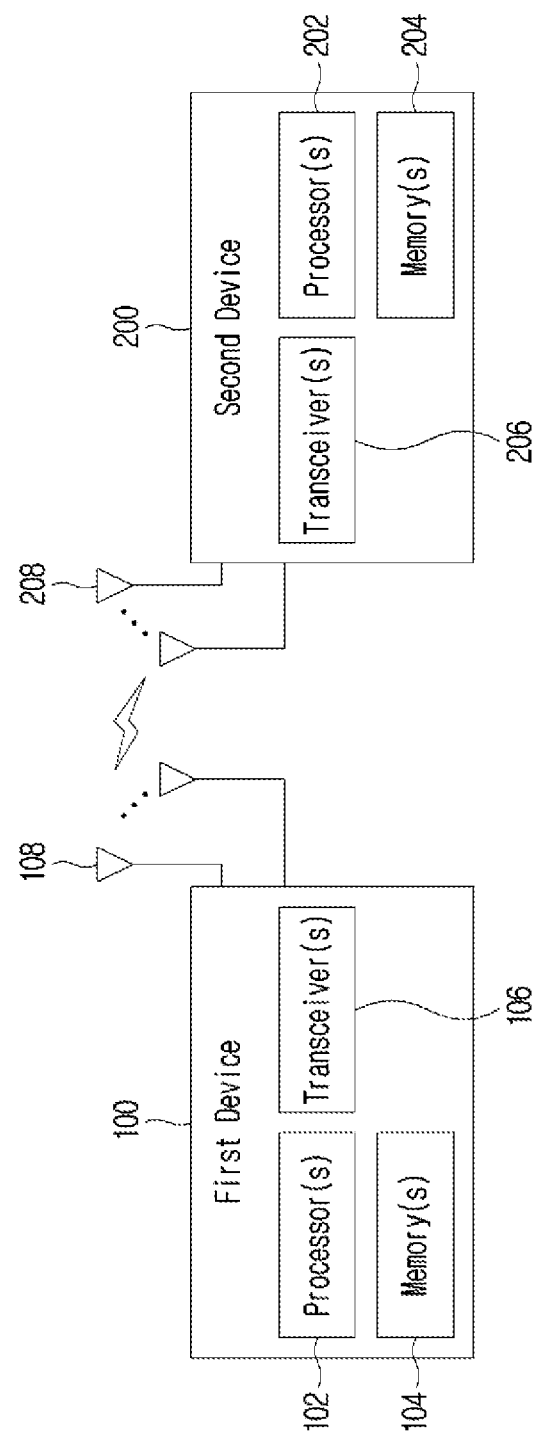
FIG. 12 is a diagram which illustrates a block diagram of a wireless communication device according to an embodiment of the present disclosure.

For example, the base station/UE signaling and operation (e.g., embodiment 1, embodiment 2, embodiment 3, FIGS. 10, 11, etc.) described above may be processed by one or more processors (e.g., 102, 202) of FIG. 12, and the above-described base station/UE signaling and operation (e.g., embodiment 1, embodiment 2, embodiment 3, FIGS. 10, 11, etc.) may be stored in a memory (e.g., one or more memories 104 and 204 of FIG. 12) in the form of an instruction/program (e.g., instruction, executable code) for driving at least one processor of FIG. 12 (e.g., 102 and 202).

General Device to which the Present Disclosure May be Applied

FIG. 12 illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method for performing uplink transmission by a user equipment (UE) in a wireless communication system, the method comprising:
receiving, from a base station (BS), information on a spatial parameter based on spatial parameter candidates including at least one of a first spatial parameter candidate or a second spatial parameter candidate; and
transmitting at least one of an uplink channel or an uplink signal to the BS, based on the spatial parameter,
wherein the first spatial parameter candidate is related to a first cell and a reference signal (RS) including at least one of a synchronization signal block (SSB), a channel state information (CSI)-RS, or a sounding reference signal (SRS),
wherein the second spatial parameter candidate is related to a second cell and a RS including at least one of a SSB, a CSI-RS, or a SRS,
wherein the first cell is a serving cell of the UE and the second cell is a cell different from the serving cell, and
wherein, based on the spatial parameter being associated with the second spatial parameter candidate, a physical cell identifier of the second cell is additionally configured for the spatial parameter.

2. The method of claim 1,
wherein each of the spatial parameter candidates is associated with one of the first cell or the second cell.

3. The method of claim 1,
wherein at least one of the spatial parameter candidates is associated with a plurality of cells.

4. The method of claim 1,
wherein the second spatial parameter candidate is further related to a specific type of a RS, and
wherein the specific type of a RS includes a type of RS other than SSS, CSI-RS, and SRS.

5. The method of claim 1,
wherein the second spatial parameter candidate is further related to a specific type of a RS, and
wherein the specific type of a RS includes at least one of mobility CSI-RS or positioning RS (PRS).

6. The method of claim 1,
wherein the second spatial parameter candidate is configured with a physical cell identifier of the second cell.

7. A user equipment (UE) for performing downlink reception or uplink transmission in a wireless communication system, the UE comprising:
at least one transceiver; and
at least one processor coupled with the at least one transceiver,
wherein the at least one processor is configured to:
receive, from a base station (BS) through the at least one transceiver, information on a spatial parameter based on spatial parameter candidates including at least one of a first spatial parameter candidate or a second spatial parameter candidate; and
transmitting at least one of an uplink channel or an uplink signal to the BS through the at least one transceiver, based on the spatial parameter,
wherein the first spatial parameter candidate is related to a first cell and a reference signal (RS) including at least one of a synchronization signal block (SSB), a channel state information (CSI)-RS, or a sounding reference signal (SRS),
wherein the second spatial parameter candidate is related to a second cell and a RS including at least one of a SSB, a CSI-RS, or a SRS,
wherein the first cell is a serving cell of the UE and the second cell is a cell different from the serving cell, and
wherein, based on the spatial parameter being associated with the second spatial parameter candidate, a physical cell identifier of the second cell is additionally configured for the spatial parameter.

8. A method for performing uplink reception by a base station (BS) in a wireless communication system, the method comprising:
transmitting, to a user equipment (UE), information on a spatial parameter among spatial parameter candidates based on at least one of a first spatial parameter candidate or a second spatial parameter candidate; and
receiving at least one of an uplink channel or an uplink signal from the UE, based on the spatial parameter,
wherein the first spatial parameter candidate is related to a first cell and a reference signal (RS) including at least one of a synchronization signal block (SSB), a channel state information (CSI)-RS, or a sounding reference signal (SRS),
wherein the second spatial parameter candidate is related to a second cell and a RS including at least one of a SSB, a CSI-RS, or a SRS,
wherein the first cell is a serving cell of the UE and the second cell is a cell different from the serving cell, and wherein, based on the spatial parameter being associated with the second spatial parameter candidate, a physical cell identifier of the second cell is additionally configured for the spatial parameter.

9. A non-transitory computer-readable medium storing at least one computer program comprising instructions that, when executed by at least one processor, cause the at least one processor to perform the method of claim 8.

10. The method of claim 8,
wherein each of the spatial parameter candidates is associated with one of the first cell or the second cell.

11. The method of claim 8,
wherein at least one of the spatial parameter candidates is associated with a plurality of cells.

12. The method of claim 8,
wherein the second spatial parameter candidate is further related to a specific type of a RS, and
wherein the specific type of a RS includes a type of RS other than SSS, CSI-RS, and SRS.

13. The method of claim 8,
wherein the second spatial parameter candidate is further related to a specific type of a RS, and
wherein the specific type of a RS includes at least one of mobility CSI-RS or positioning RS (PRS).

14. The method of claim 8,
wherein the second spatial parameter candidate is configured with a physical cell identifier of the second cell.

* * * * *